United States Patent
Park (10) Patent No.: US 10,621,382 B2
(45) Date of Patent: Apr. 14, 2020

(54) MONITORING LEAKAGE OF CORPORATION INFORMATION FOR SMART PHONE

(71) Applicant: SOOSAN INT. Co., Ltd., Seoul (KR)

(72) Inventor: Hyoung Bae Park, Seoul (KR)

(73) Assignee: SOOSAN INT. CO., LTD., Seoul (KR)

(*) Notice: Subject to any disclaimer, the term of this patent is extended or adjusted under 35 U.S.C. 154(b) by 319 days.

(21) Appl. No.: 15/103,284

(22) PCT Filed: Dec. 5, 2014

(86) PCT No.: PCT/KR2014/011974
§ 371 (c)(1),
(2) Date: Jun. 9, 2016

(87) PCT Pub. No.: WO2015/088202
PCT Pub. Date: Jun. 18, 2015

(65) Prior Publication Data
US 2016/0314321 A1    Oct. 27, 2016

(30) Foreign Application Priority Data
Dec. 10, 2013  (KR) .................... 10-2013-0152974

(51) Int. Cl.
*G06F 21/83* (2013.01)
*G06F 21/31* (2013.01)
(Continued)

(52) U.S. Cl.
CPC .......... *G06F 21/83* (2013.01); *G06F 11/3041* (2013.01); *G06F 11/3093* (2013.01);
(Continued)

(58) Field of Classification Search
CPC .. G06F 21/83; G06F 11/3041; G06F 11/3093; G06F 11/3438; G06F 21/31; G06F 21/552; G06F 21/556; G06F 21/6218; G06F 63/0245; H04L 63/2245
USPC ........................................................ 726/30
See application file for complete search history.

(56) References Cited

U.S. PATENT DOCUMENTS 8,140,855 B2 *  3/2012  Zhu ................ G06F 21/34
                                                  713/184
8,159,335 B2 *  4/2012  Cox, Jr. ............. G06F 3/023
                                                  340/407.1
(Continued)

FOREIGN PATENT DOCUMENTS

JP    2008262259 A    10/2008
JP    2010086503 A     4/2010
(Continued)

OTHER PUBLICATIONS

"International Search Report" in connection with related International Patent Application No. PCT/KR2014/011974, dated Mar. 16, 2015, 3 pages.

*Primary Examiner* — Saleh Najjar
*Assistant Examiner* — Feliciano S Mejia
(74) *Attorney, Agent, or Firm* — Kolisch Hartwell, P.C.

(57) ABSTRACT

The present invention relates to a security method for a smart phone, in which method a security keyboard app is installed in a smart phone of a staff member so as to make it possible to monitor information leakage. The security method for a smart phone comprises the steps of: running a first app on a smart phone and, when the first app is subject to key input, determining, by means of a security keyboard app installed in the smart phone, whether the first app is a predetermined app which is to be subject to security; monitoring the key input which is inputted to the first app, if the first app is a predetermined app that is to be subject to security; transmitting the monitored key input to a security server; and blocking the key input if the monitored key input includes a predetermined security key word.

16 Claims, 4 Drawing Sheets

(51) Int. Cl.
*G06F 11/34* (2006.01)
*G06F 11/30* (2006.01)
*H04L 29/06* (2006.01)
*G06F 21/55* (2013.01)
*G06F 21/62* (2013.01)

(52) U.S. Cl.
CPC .......... *G06F 11/3438* (2013.01); *G06F 21/31* (2013.01); *G06F 21/552* (2013.01); *G06F 21/556* (2013.01); *G06F 21/6218* (2013.01); *H04L 63/0245* (2013.01); *G06F 11/3013* (2013.01)

(56) References Cited

U.S. PATENT DOCUMENTS

| | | | | |
|---|---|---|---|---|
| 8,463,234 | B2* | 6/2013 | Lee | G07C 9/00039 379/37 |
| 8,613,087 | B2* | 12/2013 | Chae | G06F 21/554 726/22 |
| 8,799,809 | B1* | 8/2014 | Voutour | G06F 3/0638 715/780 |
| 9,137,257 | B2* | 9/2015 | Shuster | H04L 63/1408 |
| 9,317,701 | B2* | 4/2016 | Waterson | G06F 21/83 |
| 9,565,181 | B2* | 2/2017 | Brown | H04L 63/083 |
| 2009/0044282 | A1* | 2/2009 | Govindaraju | G06F 21/83 726/27 |
| 2014/0038564 | A1* | 2/2014 | Mahaffey | H04L 41/0253 455/411 |

FOREIGN PATENT DOCUMENTS

| | | |
|---|---|---|
| KR | 20110034351 A | 4/2011 |
| KR | 20120062590 A | 6/2012 |
| KR | 20130044107 A | 5/2013 |

* cited by examiner

MONITORING LEAKAGE OF CORPORATION INFORMATION FOR SMART PHONE

TECHNICAL FIELD

The present invention relates to technology for preventing an information leakage, and more particularly, to a system and method for monitoring an information leakage from a smart device.

BACKGROUND ART

With the development of information and communications technology, a terminal, for example, a personal digital assistants (PDA) may support multimedia functionality. Since a smart device has a close relationship with daily life, private information of an individual and classified information of a business may remain in terminals and thus, an access to information stored in the terminals may be required.

Korean Patent Application Publication No. 2013-0044107 relates to a terminal control security system and method based on management policies, and suggests technology that may prevent an information leakage by directly limiting a use of a mobile terminal according to authority of a mobile terminal user. Accordingly, technology to increase security of a smart device has been proposed. However, technology for preventing business information from leaking out through a social network service (SNS) may be needed when a user uses the SNS.

DISCLOSURE OF INVENTION

Technical Goals

An aspect of the present invention provides a system and method for preventing an information leakage by installing a security keyboard application in a smartphone and monitoring the security keyboard application.

Technical Solutions

According to an aspect of the present invention, there is provided a system for smartphone security including a security server configured to receive a key input and determine whether the key input includes a predetermined security keyword, and a smartphone configured to determine whether a first application is a predetermined security target application when a key is input to the first application and transmit the key input to the first application to the security server when the first application is the security target application, a security keyboard application installed in the smartphone, wherein the smartphone is configured to block the key input when the key input includes the predetermined security keyword.

When the key input includes the predetermined security keyword, the smartphone may be configured to delete the key input entirely by inputting a backspace corresponding to an entire text length of the key input through the security keyboard application, generate a text that does not include the security keyword from the key input, and input the generated text to the first application.

According to another aspect of the present invention, there is provided a method for smartphone security including determining whether a first application is a predetermined security target application by a security keyboard application installed in a smartphone when a key is input to the first application, the first application executed in the smartphone, monitoring a key input to the first application when the first application is the security target application, transmitting the monitored key input to a security server, and blocking the monitored key input when the monitored key input includes a predetermined security keyword.

The method for smartphone security may further include capturing a screen of the first application to which the key is input and transmitting the screen to the security server when the monitored key input includes the predetermined security keyword.

The method for smartphone security may further include performing logging on the key input to the first application by transmitting the key input to the first application to the security server when the monitored key input includes the predetermined security keyword.

The method for smartphone security may further include determining whether the monitored key input includes the predetermined security keyword.

The blocking of the key input may include deleting the key input entirely by inputting a backspace corresponding to an entire text length of the key input, generating a text that does not include the security keyword from the key input, and inputting the generated text to the first application.

The blocking of the key input may include blocking the key input entirely from the security keyboard application, such that the entire key input is not input to the first application.

Advantageous Effect

According to embodiments of the present invention, information may be prevented from leaking out through a social network service (SNS) used by a user, by installing a security keyboard application in a smartphone, determining whether the security keyboard application is a security target application through a smartphone security system and, blocking a key input based on a keyword to be input to an application.

BEST MODE FOR CARRYING OUT THE INVENTION

Hereinafter, embodiments of the present invention will be described in detail with reference to the accompanying drawings.

Figure 1:
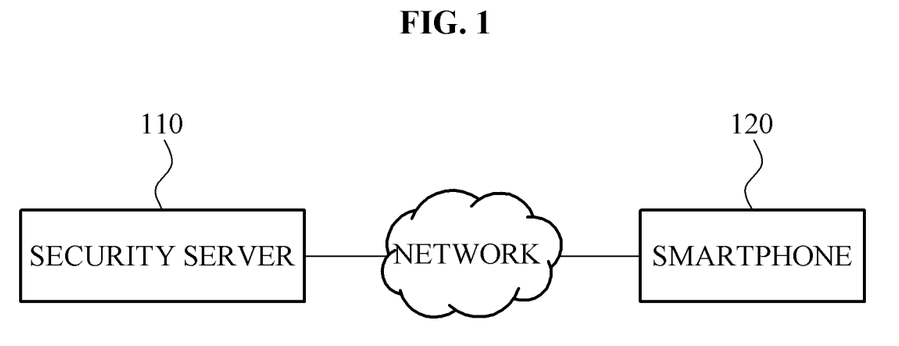
FIG. 1 is a diagram illustrating an example of a smartphone security system according to an embodiment of the present invention.

FIG. 1 is a diagram illustrating an example of a smartphone security system according to an embodiment of the present invention.

A system for smartphone security, hereinafter also referred to as a smartphone security system 100, is a system for monitoring an information leakage of a smartphone, and includes a security server 110 and a smartphone 120.

The security server 110 may be a web server to provide a function of encoding data transmitted to the Internet and performing receiving and transmitting, and may be used as a basic device for protecting private information. The security server 110 may include a security server using an application program method of providing a cryptographic communication function by applying an encryption toolkit and 'a secure sockets layer (SSL) based security server' to install an SSL certificate in an existing web server.

The security server 110 may receive a key input from a smartphone and determine whether the key input includes a predetermined security keyword. For example, a security server may store a predetermined keyword in a storage, for example, a database. If the predetermined security keyword is "plus technology" or "hacking", a security server may store the words "plus technology" and "hacking" in the database, and may determine whether the words "plus technology" or the word "hacking" is included in the key input received from the smartphone.

Also, the security server 110 may capture a screen of a first application to which the key input of the smartphone is input and receive the captured screen when the key input monitored from the smartphone includes the predetermined security keyword. For example, when the key input received from the smartphone includes at least one of the words "plus technology" or the word "hacking" corresponding to the predetermined security keyword, a screen of an application in which the word "plus technology" or the word "hacking" is input from the smartphone may be captured and the captured screen may be transmitted to the security server. Here, the security server may receive the captured screen transmitted from the smartphone.

A security keyboard application may be installed in the smartphone 120, and the smartphone 120 may determine whether a first application is a predetermined security target application when a key is input to the first application, and transmit a key input to the first application to the security server when the first application is the security target application. Also, when the key input includes the predetermined security keyword, the smartphone 120 deletes the key input entirely by inputting a backspace corresponding to an entire text length of the key input through the security keyboard application, and generates a text that does not include the security keyword from the key input, and inputs the generated text to the first application.

A smartphone security system may install a security keyboard application in a smartphone, determine whether the security keyboard application is a security target application, and block the key input through a keyword input to an application.

Figure 2:
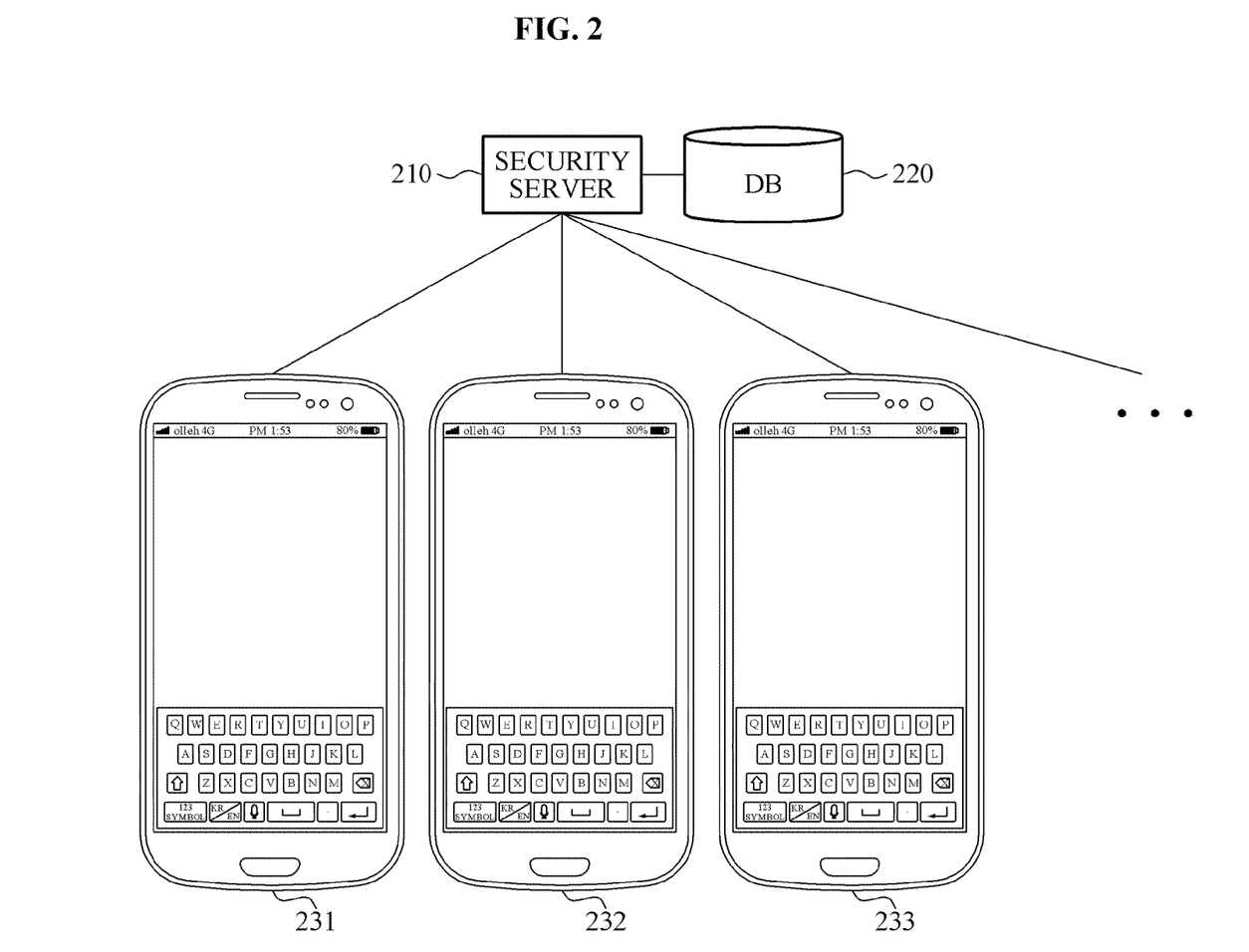
FIG. 2 is a diagram illustrating an example of monitoring a smartphone security system according to an embodiment of the present invention.

FIG. 2 is a diagram illustrating an example of monitoring a smartphone security system according to an embodiment of the present invention.

FIG. 2 illustrates an example of monitoring an operation of a security server 210 and operations of smartphones 231, 232, and 233, through a smartphone security system, and a security keyboard application may be installed in each of the smartphones 231, 232, and 233 of users. For example, the security keyboard application may be installed in each of the smartphones 231, 232, and 233 of all members of a company or an organization. Here, when the users use keyboards of the smartphones 231, 232, and 233, the security keyboard applications may be executed in the smartphones 231, 232, and 233.

Each of the security keyboard applications of the smartphones 231, 232, and 233 may determine whether a called application is an application defined by the security server 210. Here, the security server 210 may store an application defined by a storage, for example, a database (DB) 220. When the security target applications are executed from the smartphones 231, 232, and 233 by the users, keyboard inputs of the smartphones 231, 232, and 233 may be monitored. Also, the smartphone security system may monitor all keyboard inputs input by the users.

For example, when the application defined by the security server 210 is a social network service (SNS) application, for example, Kakao talk and Facebook, the security keyboard application of each of the smartphones 231, 232, and 233 may determine whether Kakao talk is the application defined by the security server 210 when the users execute Kakao talk which is one of applications defined, by the security server 210, to be security target applications. In this example, when Kakao talk executed by the users is the application defined by the security server 210, the keyboard inputs of the smartphones 231, 232, and 233 may be monitored.

The smartphone security system may transmit the monitored keyboard inputs of the smartphones 231, 232, and 233 to the security server 210. The security server 210 may determine whether the security keyword is included in the monitored keyboard inputs. The security server 210 may store the security keyword in the storage, for example, the DB 220. The security server 210 may determine whether a keyboard input of a smartphone includes a security keyword stored in the DB 220.

When the security keyword is included in the keyboard inputs of the smartphones 231, 232, and 233, for example, when security keywords are "telephone number" and "security", and when the keyword "telephone number" is included in the keyboard inputs of the smartphones 231, 232, and 233, inputs of the smartphones 231, 232, and 233 may be disabled, an alarm message may be output to the smartphones 231, 232, and 233, a screen including a security keyword may be captured, and logging may be performed. Here, when the security keyword is included in the keyboard inputs of the smartphones 231, 232, and 233, at least one operation of disabling an input of a smartphone, outputting an alarm message to the smartphone, capturing a screen of an application to which a keyword is input, and performing logging by transmitting a key input to an application to a security server may be performed in the smartphone security system.

Also, when keyboards of the security keyboard applications of the smartphones 231, 232, and 233 are used, the smartphone security system may analyze a text created while a predetermined key, for example, a space, a comma (,), and a period (.), is input. Here, the security server 210 may determine whether the security keyword is included in texts input from the smartphones 231, 232, and 233. The smartphone security system may delete a key input entirely by inputting a backspace corresponding to an entire text length of the key input for blocking the key input, when the predetermined security keyword is included in the key input monitored from each of the smartphones 231, 232, and 233. The smartphone security system may generate a text that does not include the security keyword from the key input and input the generated text to a first application.

Figure 4:
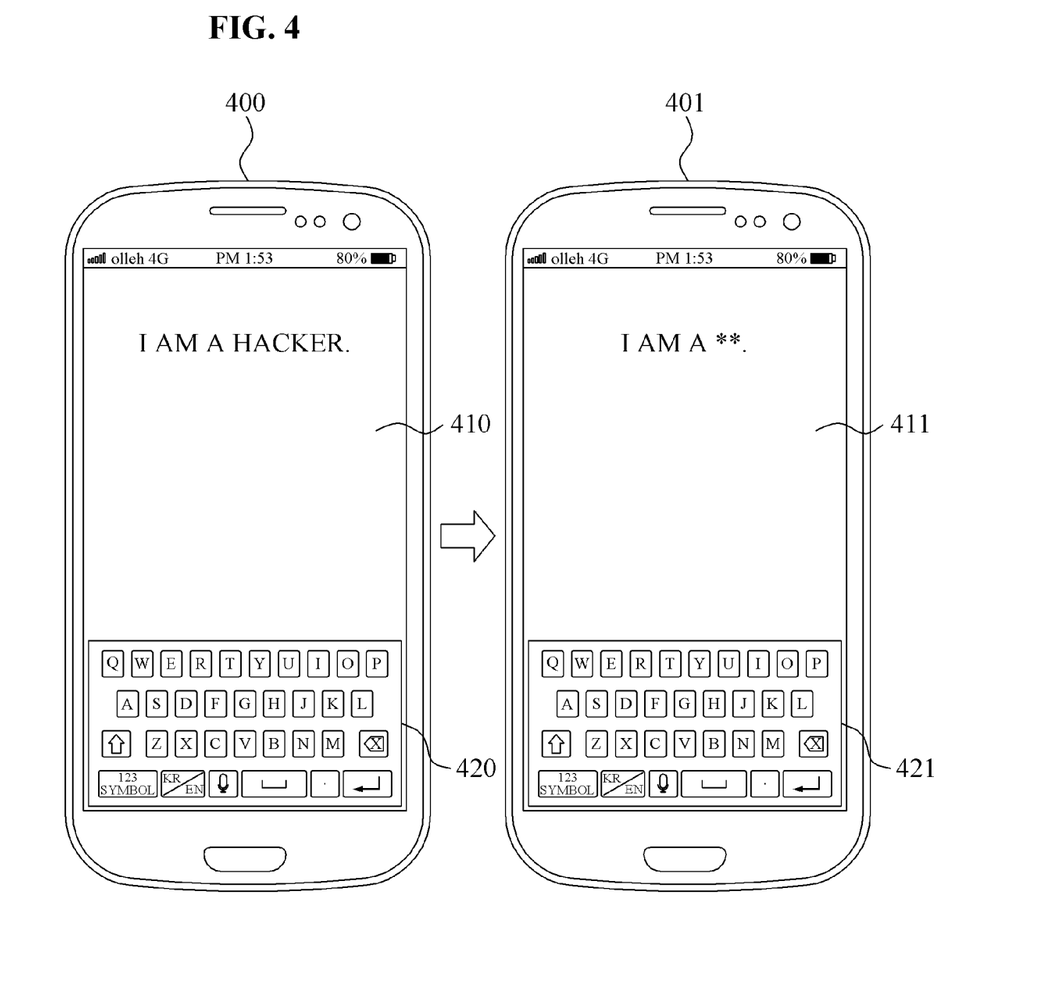
FIG. 4 is a diagram illustrating an example of an operation when a security keyword is input to a smartphone security system according to an embodiment of the present invention.

Referring to FIG. 4, for example, when the predetermined keyword is "hacker", the security server 210 may determine whether the keyword "hacker" corresponding to the security keyword is included in a text input to each of the smartphones 231, 232, and 233. In this example, the key such as a space, a comma (,), and a period (.) may be input and thus, the texts input to the smartphones 231, 232, and 233 may be analyzed.

The smartphone security system may delete the word "hacker" by inputting a backspace corresponding to an entire length of a text of a key input in order to block the keyword "hacker", when the security keyword "hacker" is included in the monitored key input. Here, when the security keyword is deleted from the input text, a space of the deleted keyword may be indicated by a blank space, or a text, for example, **, may be generated and input to an application. Detailed descriptions of a method of deleting a security keyword when the security keyword is input to a smartphone will be provided with reference to FIG. 4.

The smartphone security system may monitor for an information leakage.

Figure 3:
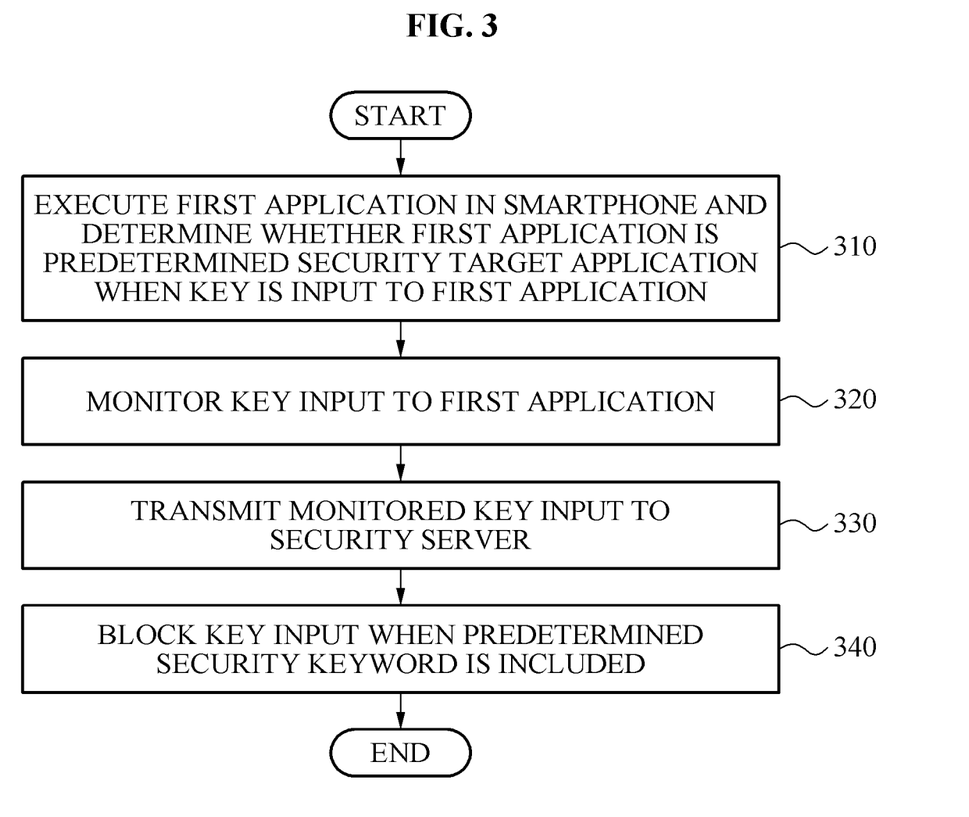
FIG. 3 is a flowchart illustrating an example of a smartphone security method according to an embodiment of the present invention.

FIG. 3 is a flowchart illustrating an example of a smartphone security method according to an embodiment of the present invention.

The smartphone security method may be performed by a smartphone security system. Related descriptions of the smartphone security system are provided with reference to FIGS. 1 and 2.

In operation 310, the smartphone security system executes a first application in a smartphone, and determines whether the first application is a predetermined security target application by a security keyboard application installed in a smartphone when a key is input to the first application.

In operation 320, the smartphone security system monitors a key input to the first application when the first application is the security target application.

In operation 330, the smartphone security system transmits the monitored key input to a security server. Here, the smartphone security system may determine whether the monitored key input includes a predetermined security keyword.

In operation 340, the smartphone security system blocks the key input when the monitored key input includes the predetermined security keyword. Here, when the key input includes the predetermined security keyword, the smartphone security system may delete the key input entirely by inputting a backspace corresponding to an entire text length of the key input through the security keyboard application, and input the generated text to the first application.

FIG. 4 is a diagram illustrating an example of an operation performed when a security keyword is input to a smartphone security system according to an embodiment of the present invention. Related descriptions of the smartphone security system are provided with reference to FIGS. 1 and 3.

The smartphone security system may install a security keyboard application and determine whether an application is a predetermined security target application when a key is input to the application. When the application is the security target application, a key input to the application may be monitored. The smartphone security system may transmit the monitored key input to the application to a security server.

The smartphone security system may block the key input when a key input monitored from each of smartphones 400 and 401 includes a predetermined security keyword. For example, when a predetermined key, for example, a space, a comma (,), and a period (.), is input by each of keyboards 420 and 421, a text created while the predetermined key is input may be analyzed to determine whether the text includes the predetermined keyword. When a security keyword is input to each of the smartphones 400 and 401, the security keyword may be deleted by inputting a backspace corresponding to a length of the security keyword. Alternatively, a backspace corresponding to an entire text length of the key input may be input and the text that does not include the security keyword may be input.

It is supposed that the predetermined security keyword in the smartphone security system is a word "hacker". For example, a user may input a sentence "I am a hacker." to the smartphones 400 and 401 through the keyboards 420 and 421. A plurality of sentences other than the sentence "I am a hacker." may exist in input screens 410 and 411 of the smartphone 400. The security server may determine whether the keyword "hacker" is included in the text input to the input screens 410 and 411 of the smartphones 400 and 401.

The smartphone security system may delete the keyword "hacker" by inputting a backspace corresponding to a length of the keyword "hacker", when the keyword "hacker" is included in the monitored key input of a smartphone. Also, a backspace corresponding to an entire length of the input text may be input, and a text that does not include the keyword "hacker" may be input. For example, the keyword "hacker" may be indicated by a blank space and asterisks, for example, **. Accordingly, the smartphone security system may block the key input entirely from the security keyboard such that the entire key input is not input to a first application.

The smartphone security system may output a security keyword as if the security keyword is not input even when the user inputs the security keyword, and may prevent an information leakage before network transmission.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A system for smartphone security, the system comprising:
   a security server configured to receive a key input and determine whether the key input comprises a predetermined security keyword; and
   a smartphone provided with a security keyboard application, wherein the smartphone is configured to:
   determine whether a first application is a predetermined security target application by a security keyboard application installed in a smartphone when a key is input to the first application, the first application being executed in the smartphone;
   transmit, the key input to the first application, to the security server when the first application is the security target application;
   block the key input, upon receipt of an indication from the security server that the key input comprises the predetermined security keyword; and
   wherein when the key input comprises the predetermined security keyword, the smartphone is configured to delete the key input entirely by inputting a backspace corresponding to an entire text length of the key input through the security keyboard application, generate a text that does not comprise the security keyword from the key input, and input the generated text to the first application.

2. The system of claim 1, wherein the smartphone is configured to capture a screen of the first application to which the key is input and transmit the screen to the security server when the key input comprises the predetermined security keyword.

3. The system of claim 1, wherein the smartphone is configured to block the key input entirely from the security keyboard application, such that the entire key input is not input to the first application when the key input comprises the predetermined security keyword.

4. The system of claim 1, wherein the smartphone is configured to output a warning message to the smartphone when the key input comprises the predetermined security keyword.

5. The system of claim 1, wherein the smartphone is configured to transmit the key input before a preset key is input to the security server when the preset key is input to the first application.

6. The system of claim 5, wherein the preset key comprises at least one of a space, a comma, or a period.

7. The system of claim 1, wherein the smartphone is configured to delete the security keyword and input a blank space or a preset text instead of the security keyword when the key input comprises the predetermined security keyword.

8. A method for smartphone security, the method comprising:
   determining whether a first application is a predetermined security target application by a security keyboard application installed in a smartphone when a key is input to the first application, the first application executed in the smartphone;
   monitoring a key input to the first application when the first application is the security target application;
   transmitting the monitored key input to a security server;
   blocking the monitored key input, upon receipt of an indication from the security server that the monitored key input comprises a predetermined security keyword; and
   wherein the blocking of the key input comprises:
   deleting the key input entirely by inputting a backspace corresponding to an entire text length of the key input;
   generating a text that does not comprise the security keyword from the key input; and
   inputting the generated text to the first application.

9. The method of claim 8, further comprising:
   capturing a screen of the first application to which the key is input and transmitting the screen to the security server when the monitored key input comprises the predetermined security keyword.

10. The method of claim 8, further comprising:
    performing logging on the key input to the first application by transmitting the key input to the first application to the security server when the monitored key input comprises the predetermined security keyword.

11. The method of claim 8, further comprising:
    determining whether the monitored key input comprises the predetermined security keyword.

12. The method of claim 8, wherein the blocking of the key input comprises blocking the key input entirely from the security keyboard application, such that the entire key input is not input to the first application.

13. The method of claim 8, further comprising:
outputting a warning message to the smartphone when the monitored key input comprises the predetermined security keyword.

14. The method of claim 8, wherein the transmitting of the monitored key input to the security server comprises transmitting the key input before a preset key is input to the security server when the preset key is input to the first application.

15. The method of claim 14, wherein the preset key comprises at least one of a space, a comma, or a period.

16. The method of claim 8, wherein the blocking of the monitored key input comprises deleting the security keyword and inputting a blank space or a preset text instead of the security text when the key input comprises the predetermined security keyword.

* * * * *